United States Patent [19]
Sugawara

[11] Patent Number: 5,535,251
[45] Date of Patent: Jul. 9, 1996

[54] SYSTEM FOR SYNCHRONIZING REAL TIME CLOCK BY TRANSMITTED REAL TIME INFORMATION

[75] Inventor: Eiji Sugawara, Kawasaki, Japan

[73] Assignee: Fujitsu Limited, Kanagawa, Japan

[21] Appl. No.: 210,238

[22] Filed: Mar. 17, 1994

[30] Foreign Application Priority Data

Sep. 17, 1993 [JP] Japan .................................. 5-231125

[51] Int. Cl.⁶ .............................. H04L 7/00; H04L 7/02; H04J 3/06
[52] U.S. Cl. ......................... 375/356; 375/354; 375/355; 375/359; 370/100.1
[58] Field of Search ................................... 375/106, 107, 375/110, 354, 355, 356, 359; 370/100.1, 105.1, 105.4, 105.5

[56] References Cited

U.S. PATENT DOCUMENTS

| | | | |
|---|---|---|---|
| 3,665,405 | 5/1972 | Sanders | 370/105.1 |
| 4,530,091 | 7/1985 | Crockett | 370/100.1 |
| 4,677,614 | 6/1987 | Circo | 375/107 |
| 4,679,188 | 7/1987 | Fukuda | 370/105.1 |
| 4,709,347 | 11/1987 | Kirk | 380/4 |
| 4,794,624 | 12/1988 | Braun | 375/108 |
| 5,062,124 | 10/1991 | Hayashi | 375/107 |
| 5,063,596 | 11/1991 | Dyke | 364/900 |
| 5,184,347 | 2/1993 | Farwell | 375/107 |
| 5,331,667 | 7/1994 | Izumi | 370/100.1 |

FOREIGN PATENT DOCUMENTS 3216201  5/1983  Germany.

OTHER PUBLICATIONS

Klaus D. Schenkle, "The Synchronous Digital Multiplex Hierarchy—The Challenge and the Opportunities", ITG Technical Conf., Oct. 1990, pp. 41–48.

"American National Standard for Telecommunications, Digital Hierarchy—Optical Interface Rates and Formats Specifications (SONET)", a draft of ANSI T1 105, Nov. 1990.

CCITT Recommendations G.707, G.708, and G.709, Jul. 1992.

*Primary Examiner*—Stephen Chin
*Assistant Examiner*—Vijay Shankar

[57] ABSTRACT

A real time clock synchronizing system, provided in each of a plurality of network elements in a synchronous transmission network, comprises: a generating unit for generating, based on a reference clock, self-generated real time information indicating a real time of the network element. The system also includes an extracting unit for extracting reference real time information contained in an overhead area of synchronous signals received by the network element. A selector unit selects as a reference real time information to be transmitted from the network element, one of the self-generated real time information and the reference real time information extracted by the extracting unit. A transmitting unit contains the reference real time information selected by the selector unit, in an overhead area of synchronous signals to be transmitted from the network element.

11 Claims, 7 Drawing Sheets

| YY | MM | DD | HH | mm | SS |

| YY | MM | DD | HH | mm | SS | CHECK |

SYSTEM FOR SYNCHRONIZING REAL TIME CLOCK BY TRANSMITTED REAL TIME INFORMATION

BACKGROUND OF THE INVENTION

1. Field of the Invention

The present invention relates to a real time clock synchronizing system provided in network elements in synchronous transmission networks such as networks in accordance with the synchronous digital hierarchy (SDH) defined by CCITT recommendation G.707, 708, and 709, and the synchronous optical network (SONET) defined in ANSI T1.105. In the synchronous transmission networks, occurrences of alarm events are detected in individual network elements, and are reported to a centralized monitor apparatus, together with information on real times at which the alarm events have occurred. The centralized monitor apparatus collects the real time information concerning the occurrences of and recoveries from the alarm events. Therefore, each network element contains provision for supplying the real time information. It is desirable that all of the network elements supply the synchronized real times to the centralized monitor apparatus with high accuracy.

2. Description of the Related Art

When an alarm event has occurred in a network element in the synchronous transmission network, the network element generates information on the occurrence of the alarm event, and transmits the same to the centralized monitor apparatus. The information on the real time at which the alarm event has occurred, is included in the above information on the occurrence of the alarm event. The centralized monitor apparatus collects such information from network elements in the synchronous transmission network, and holds histories of the occurrences of alarm events in the respective network elements in the network.

In the conventional synchronous transmission networks, each network element contains a real time clock (RTC) circuit which generates a real time clock based on clock signals generated by a local oscillator contained in the real time clock circuit. Thus, the above information on the real time included in the above information on the occurrence of the alarm event, is generated based on the real time clock generated by the real time clock circuit.

However, in the conventional synchronous transmission networks having provision as above, considerable differences arise among real times generated in respective network elements due to temperature variation and voltage variation. Therefore, the centralized monitor apparatus cannot obtain accurate real time information from the network elements in the synchronous transmission network.

SUMMARY OF THE INVENTION

An object of the present invention is to provide a real time clock synchronizing system wherein clocks in respective network elements in the network have the same real time with high accuracy.

According to the first aspect of the present invention, there is provided a real time clock synchronizing system, provided in each of a plurality of synchronous transmission network apparatuses (network elements) in a synchronous transmission network. The synchronous transmission network apparatus receives synchronous signals from a first other one of the plurality of synchronous transmission network apparatuses, and transmits synchronous signals to a second other one of the plurality of synchronous transmission network apparatuses, where the synchronous signals conveying a transmission frame, and the transmission frame includes an area containing reference real time information which indicates the real time in the synchronous transmission network. The area may be an overhead area. The real time clock synchronizing system contains: a real time information generating unit for generating based on a reference clock, self-generated real time information indicating a self-generated real time in the synchronous transmission network apparatus; a real time information extracting unit for extracting the reference real time information contained in the above area of the synchronous signals received by the synchronous transmission network apparatus; a first selector unit for selecting as the reference real time information to be transmitted by the synchronous transmission network apparatus, one of the self-generated real time information and the reference real time information extracted by the real time information extracting unit; and a real time information inserting unit for inserting the reference real time information selected by the first selector unit, in the above area of the synchronous signals to be transmitted by the synchronous transmission network apparatus.

In addition to the above construction of the real time clock synchronizing system according to the first aspect of the present invention, the real time clock synchronizing system may further contain a selector control unit for controlling the first selector unit so that, when the above each synchronous transmission network apparatus is designated as a synchronization master apparatus in the synchronous transmission network, the first selector unit selects the self-generated real time information.

In addition to the above construction of the real time clock synchronizing system according to the first aspect of the present invention, the real time clock synchronizing system may further contain a selector control unit for controlling the first and second selector units so that, when the above each synchronous transmission network apparatus is designated as a synchronization slave apparatus in the synchronous transmission network, the first selector unit selects the reference real time information.

In addition to the above construction of the real time clock synchronizing system according to the first aspect of the present invention, the real time clock synchronizing system may further contain: an error check information generating unit for generating error check information to be used by the error check unit in the synchronous transmission network apparatus which receives the synchronous signals conveying the transmission frame including the area containing reference real time information, for performing a bit error check operation concerning a bit error included in the reference real time information; an error check information inserting unit for inserting in the area containing real time information, the error check information, in addition to the reference real time information; an error check information extracting unit for extracting the error check information from the area containing real time information in the synchronous signals received by the above each synchronous transmission network apparatus; an error check unit for performing an error check of the reference real time information contained in the area containing real time information in the synchronous signals received by the above each synchronous transmission network apparatus, by using the error check information extracted by the error check information extracting unit; and a selector control unit for controlling the first selector unit so that, when the above each synchronous transmission network apparatus is designated as a synchronization slave apparatus in the synchronous transmission network, the first selector unit selects the reference real time information when an error is not found by the error check, and the first selector unit selects the self-generated real time information when an error is found by the error check.

In addition to the above construction of the first aspect of the present invention, the synchronous transmission network apparatus may further contain a clock signal generating unit for generating a self-generated clock signal, and a receiving clock extracting unit for extracting a receiving clock signal from the synchronous signals received by the synchronous transmission network apparatus. The real time clock synchronizing system may further contain a second selector unit for selecting as the synchronization clock signal one of the self-generated clock signal and the receiving clock signal.

In addition to the above construction of the real time clock synchronizing system containing the second selector unit, the real time clock synchronizing system may further contain a selector control unit for controlling the first and second selector units so that, when the synchronous transmission network apparatus is designated as a synchronization master apparatus in the synchronous transmission network, the second selector unit may select the self-generated clock signal, and the first selector unit may select the self-generated real time information.

In addition to the above construction of the real time clock synchronizing system containing the second selector unit, the real time clock synchronizing system may further contain a selector control unit for controlling the first and second selector units so that, when the synchronous transmission network apparatus is designated as a synchronization slave apparatus in the synchronous transmission network, the second selector unit may select the receiving clock signal, and the first selector unit may select the reference real time information.

According to the second aspect of the present invention, the real time clock synchronizing system may further contain: in addition to the above construction of the first aspect of the present invention; an error check information generating unit for generating error check information to be used by the error check unit in the synchronous transmission network apparatus which receives the synchronous signals conveying the transmission frame including the area containing reference real time information, for performing a bit error check operation concerning a bit error included in the reference real time information; an error check information inserting unit for inserting the error check information in the area containing real time information, in addition to the reference real time information; an error check information extracting unit for extracting the error check information from the area containing real time information in the synchronous signals received by the above each synchronous transmission network apparatus; an error check unit for performing an error check of the reference real time information contained in the area containing real time information in the synchronous signals received by the above each synchronous transmission network apparatus, by using the error check information extracted by the error check information extracting unit; and a selector control unit for controlling the first selector unit so that, when the above each synchronous transmission network apparatus is designated as a synchronization slave apparatus in the synchronous transmission network, the first selector unit selects the reference real time information when an error is not found by the error check, and the first selector unit selects the self-generated real time information when an error is found by the error check.

In addition to the above constructions of the first and second aspects of the present invention, the synchronous transmission network apparatus may further contain an alarm information control unit for generating alarm information containing a real time at which an alarm event occurs, where the real time is determined based on the reference real time information selected by the first selector unit.

In addition to the above constructions containing the alarm information control unit, the synchronous transmission network apparatus may further contain an alarm event reporting unit for transmitting the alarm information generated by the alarm information generating unit, to a centralized monitor apparatus provided for controlling alarm information in the synchronous transmission network.

In addition to the above constructions of the first and second aspects of the present invention, the area containing reference real time information is provided in an overhead of the synchronous signals.

DESCRIPTION OF THE PREFERRED EMBODIMENTS

Figure 1:
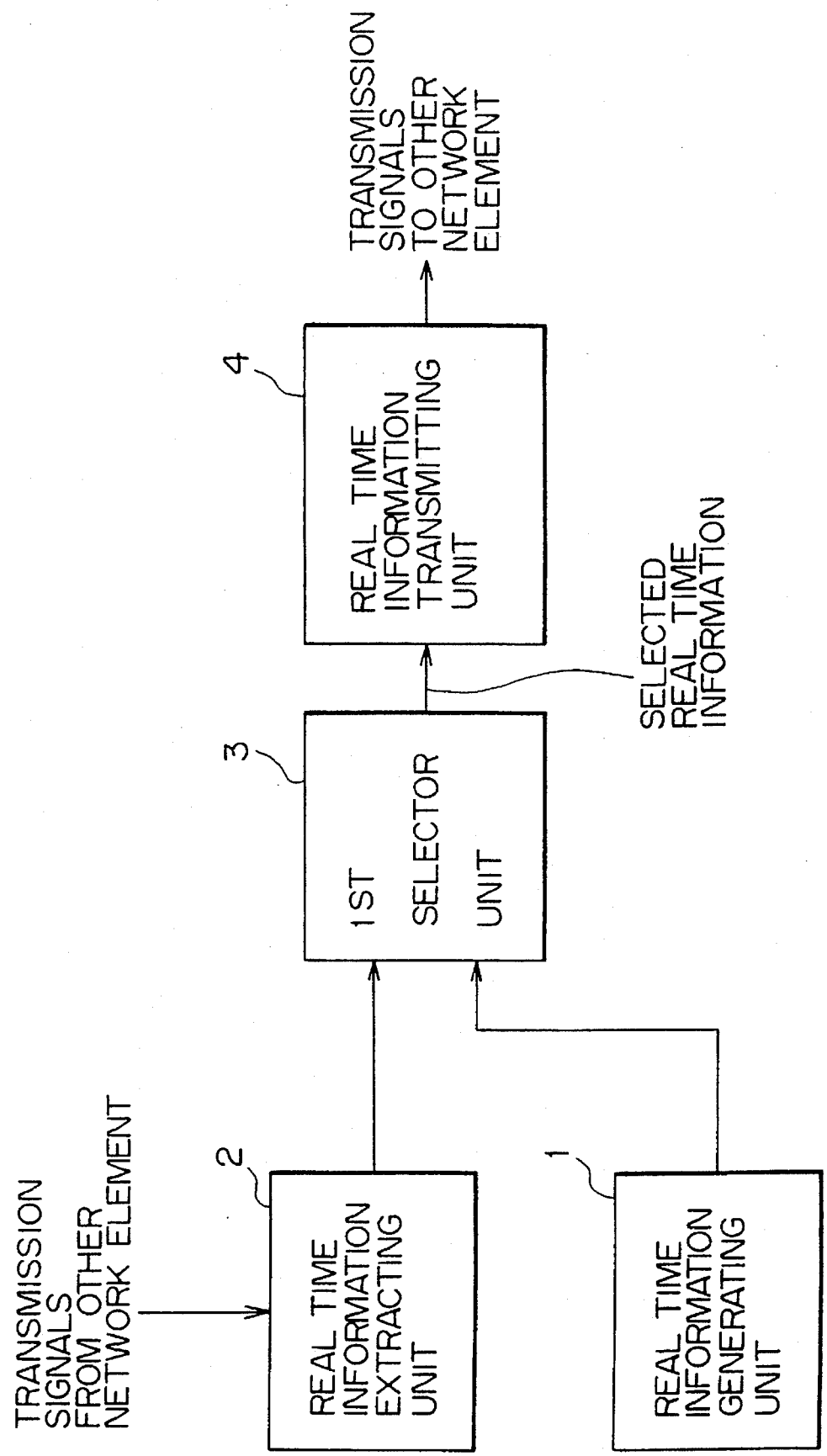
FIG. 1 is a diagram illustrating a basic construction of the real time clock synchronizing system according to the first aspect of the present invention.
Figure 2:
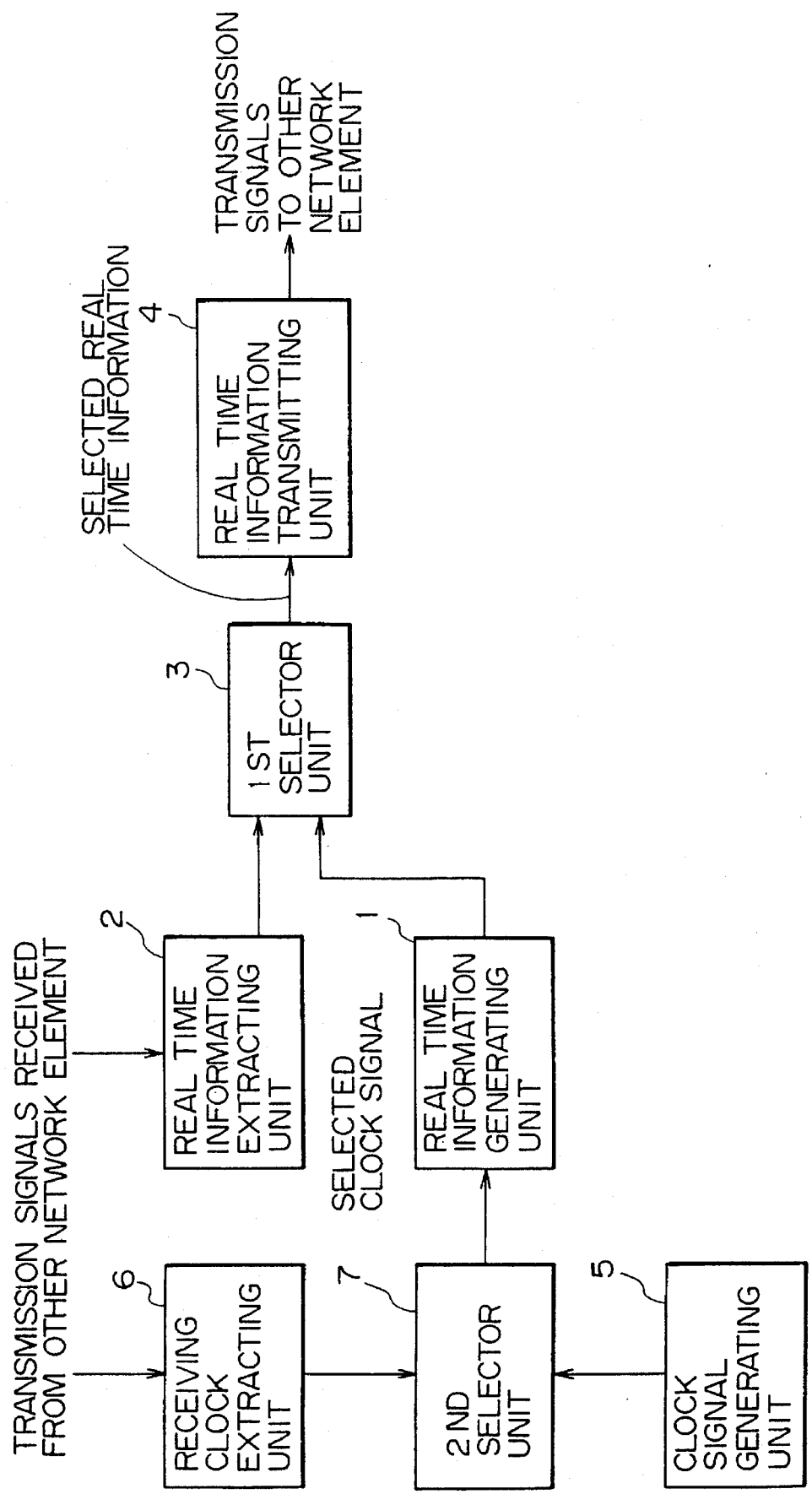
FIG. 2 is a diagram illustrating a modified construction of the first aspect of the present invention, in which additional elements are provided for selecting the synchronization clock signal.
Figure 3:
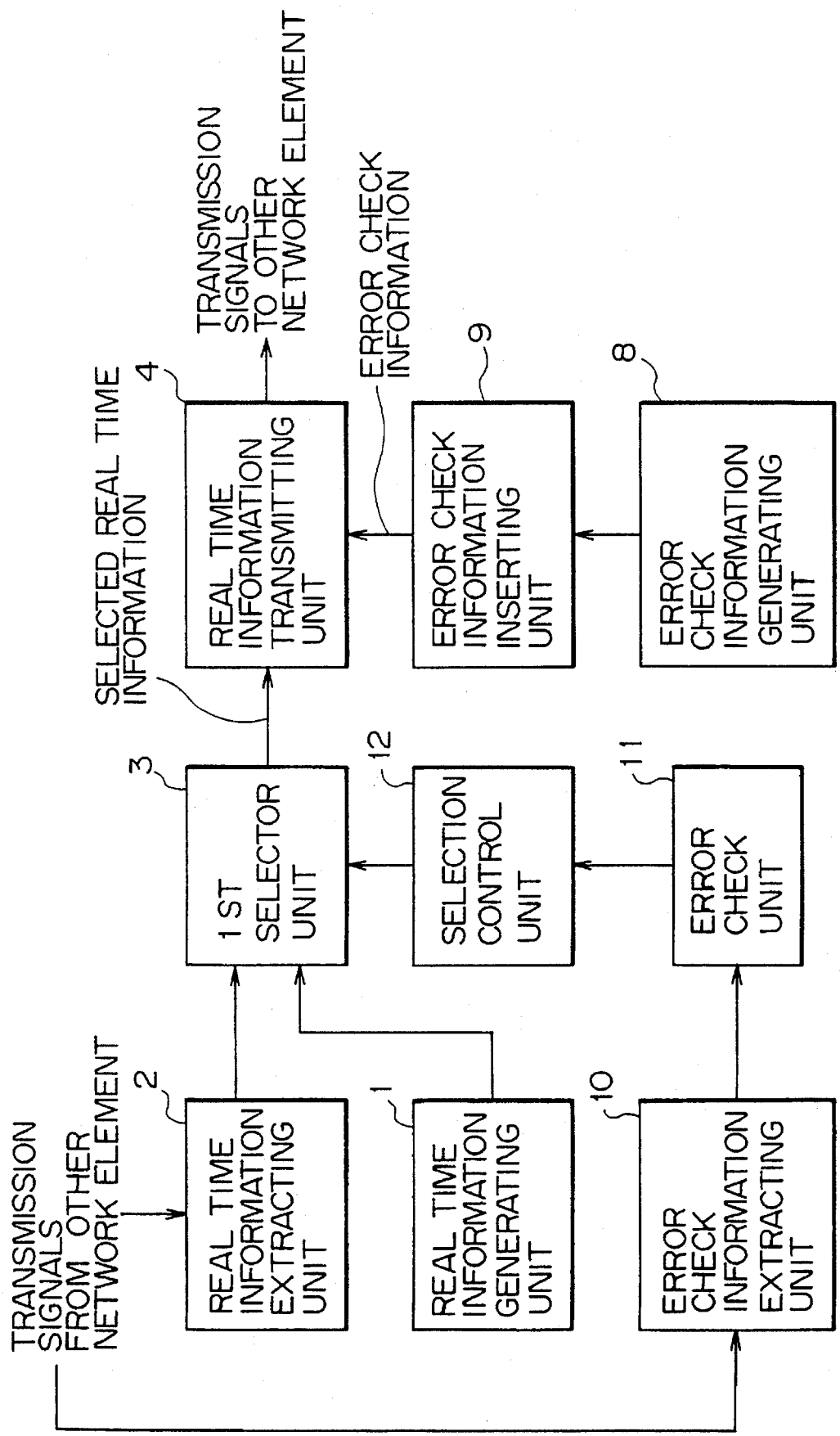
FIG. 3 is a diagram illustrating the construction of the second aspect of the present invention.

Basic Construction (FIGS. 1, 2, and 3)

FIG. 1 is a diagram illustrating a basic construction of the real time clock synchronizing system according to the first aspect of the present invention. The real time clock synchronizing system according to the first and second aspects of the present invention is provided in each of a plurality of synchronous transmission network apparatuses in a synchronous transmission network. Each synchronous transmission network apparatus receives synchronous signals from a first other one of the plurality of synchronous transmission network apparatuses and transmits synchronous signals to a second other one of the plurality of synchronous transmission network apparatuses. In addition, according to the first aspect of the present invention, the synchronous signals conveying a transmission frame, and the transmission frame includes an area containing reference real time information indicating a real time in the synchronous transmission network.

In FIG. 1, reference numeral 1 denotes a real time information generating unit, 2 denotes a real time information extracting unit, 3 denotes a first selector unit, and 4 denotes a real time information inserting unit.

As described in the summary of the invention, the real time clock synchronizing system according to the present invention, is provided in each of a plurality of synchronous transmission network apparatuses (network elements) constituting a synchronous transmission network. Each synchronous transmission network apparatus is connected to at least one other synchronous transmission network apparatus in the synchronous transmission network. Each synchronous transmission network apparatus receives synchronous signals from a first other one of the plurality of synchronous transmission network apparatuses, and transmits synchronous signals to a second other one of the plurality of synchronous transmission network apparatuses. The first and second other synchronous transmission network apparatuses may or may not be the same synchronous transmission network apparatus. The synchronous signals convey a transmission frame including an area (an overhead area) containing reference real time information which indicates a common real time normally used for all of the synchronous transmission network apparatuses in the synchronous transmission network.

The real time clock synchronizing system provided in each synchronous transmission network apparatus contains: the real time information generating unit 1, the real time information extracting unit 2, the first selector unit 3, and the real time information inserting unit 4. The real time information generating unit 1 generates based on a reference clock, self-generated real time information indicating a self-generated real time in the synchronous transmission network apparatus. The real time information extracting unit 2 extracts the reference real time information contained in the area containing real time information in the synchronous signals received by the synchronous transmission network apparatus. The first selector unit 3 selects as reference real time information to be transmitted from the synchronous transmission network apparatus, one of the self-generated real time information and the reference real time information extracted by the real time information extracting unit 2. The real time information inserting unit 4 inserts the reference real time information selected by the first selector unit 3, in the area containing real time information in the synchronous signals to be transmitted from the synchronous transmission network apparatus.

According to the above construction of the first aspect of the present invention, each synchronous transmission network apparatus can select one of the self-generated real time and the reference real time as real time information to be used in the synchronous transmission network apparatus, and can transmit the selected real time information to the other synchronous transmission network apparatus. Therefore, real time information selected in the respective synchronous transmission network apparatuses flows in the synchronous transmission network.

In the above construction of FIG. 1, when the synchronous transmission network apparatus is designated as a synchronization master apparatus in the synchronous transmission network, the first selector unit 3 may select the self-generated real time information. In addition, when the synchronous transmission network apparatus is designated as a synchronization slave apparatus in the synchronous transmission network, the first selector unit 3 may select the reference real time information extracted by the real time information extracting unit.

FIG. 2 is a diagram illustrating a modified construction of the first aspect of the present invention, in which additional elements are provided for selecting the synchronization clock signal. In the construction of FIG. 2, the synchronous transmission network apparatus further contains a clock signal generating unit 5, a receiving clock extracting unit 6, and a second selector unit 7. The clock signal generating unit 5 generates a self-generated clock signal, and the receiving clock extracting unit 6 extracts a receiving clock signal from the synchronous signals received by the synchronous transmission network apparatus. The second selector unit 7 selects as the synchronization clock signal one of the self-generated clock signal and the receiving clock signal.

In the above construction of FIG. 2, when the synchronous transmission network apparatus is designated as a synchronization master apparatus in the synchronous transmission network, the second selector unit 7 may select the self-generated clock signal as the synchronization clock signal (which is supplied to the real time generating unit 1 and the other portions of the synchronous transmission network apparatus), and the first selector unit 3 may select the self-generated real time information. In addition, when the synchronous transmission network apparatus is designated as a synchronization slave apparatus in the synchronous transmission network, the second selector unit 7 may select the receiving clock signal as the synchronization clock signal (which is supplied to the real time generating unit 1 and the other portions of the synchronous transmission network apparatus), and the first selector unit 3 may select the reference real time information extracted by the real time information extracting unit 2.

FIG. 3 is a diagram illustrating the construction of the second aspect of the present invention. According to the second aspect of the present invention, the above area containing reference real time information, further contains error check information for performing a bit error check operation concerning a bit error included in the reference real time information. In the construction of FIG. 3, the synchronous transmission network apparatus contains, in addition to the construction of the first aspect of the present invention, an error check information generating unit 8, an error check information inserting unit 9, an error check information extracting unit 10, an error check unit 11, and a selector control unit 12.

The error check information generating unit 8 generates error check information to be used by the error check unit 11 in the synchronous transmission network apparatus which receives the synchronous signals conveying a transmission frame including an area containing reference real time information, for performing a bit error check operation concerning a bit error included in the reference real time information. The error check information inserting unit 9 inserts in the area containing real time information, the error check information generated by the error check information generating unit 8, in addition to the reference real time information. The error check information extracting unit 10 extracts the error check information from the area containing real time information in the synchronous signals received by the each synchronous transmission network apparatus. The error check unit 11 performs an error check operation of the reference real time information contained in the area containing real time information in the synchronous signals received by the synchronous transmission network apparatus, by using the error check information extracted by the error check information extracting unit 10. The selector control unit 12 controls the first selector unit 3 so that, when said each synchronous transmission network apparatus is designated as a synchronization slave apparatus in the synchronous transmission network, the first selector unit 3 selects the reference real time information when an error is not found by the error check, and the first selector unit 3 selects the self-generated real time information when an error is found by the error check operation.

In the case wherein the construction of FIG. 3 is further equipped with the additional construction indicated in FIG. 2; the selector control unit 12 controls the first and second selector units 3 and 7 so that, when the synchronous transmission network apparatus is designated as a synchronization slave apparatus in the synchronous transmission network, the second selector unit 7 selects the receiving clock signal; and the first selector unit 3 selects the reference real time information when an error is not found by the error check, and the first selector unit 3 selects the self-generated real time information when an error is found by the error check operation. Construction of Embodiment (FIG. 4)

Figure 4:
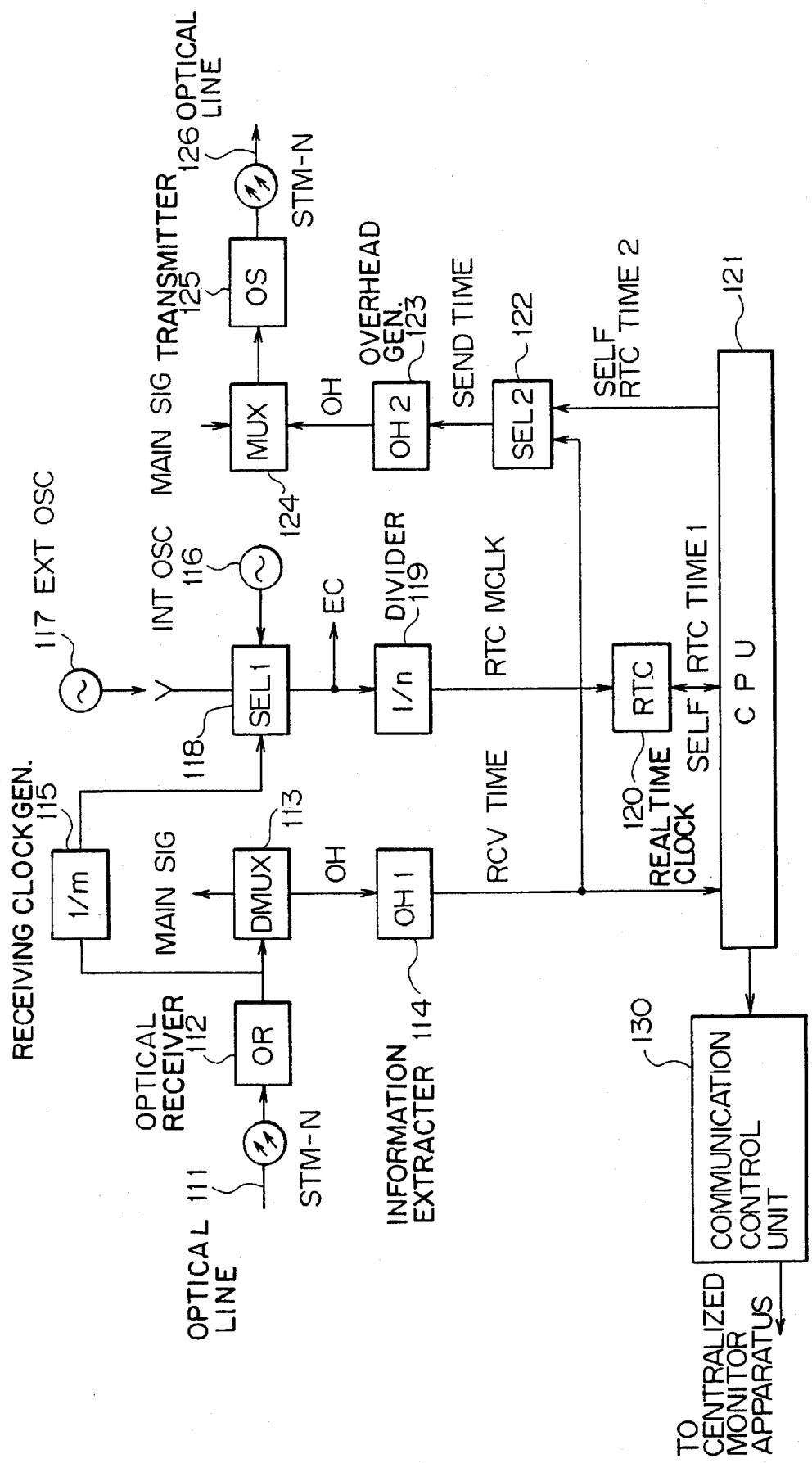
FIG. 4 is a diagram illustrating the construction of the real time clock synchronizing system as an embodiment of the present invention.

FIG. 4 is a diagram illustrating the construction of the real time clock synchronizing system as an embodiment of the present invention. The real time clock synchronizing system of FIG. 4 is provided in each network element in the synchronous transmission network. In FIG. 4, reference numeral 111 denotes an optical transmission line which transmits optical signals conveying transmission frames such as STM-N (where N is an integer greater than zero) frames according to the synchronous digital hierarchy (SDH) or STS-N (where N is an integer greater than zero)according to the synchronous optical network (SONET). Hereinafter, the explanations are made for systems according to the synchronous digital hierarchy (SDH).

Reference numeral 112 denotes an optical receiver (OR) containing an opto-electric conversion unit. The optical receiver (OR) 112 receives the optical signals transmitted through the optical transmission line 111, and converts the optical signals to electrical signals (STM-N signals). Reference numeral 113 denotes a demultiplexer unit (DMUX) which divides the STM-N signals into main signals (traffic signals) and overhead signals (OH). Reference numeral 124 denotes a multiplexer unit (MUX) which multiplexes overhead signals (OH) to be transmitted and main (traffic) signals to be transmitted, to generate STM-N signals. Reference numeral 125 denotes an optical transmitter (OS) which converts the STM-N signals output from the multiplexer unit 125 into optical signals. Reference numeral 126 denotes an optical transmission line which transmits the optical signals transmitted from the optical transmitter 125.

In addition, reference numeral 114 denotes an real time information extracting unit (OH1) which extracts from predetermined one or more time slots in the overhead signals output from the demultiplexer unit 113, portions (OHB) of the overhead signals which contain reference real time information, and converts the extracted portions (OHB) of the overhead signals into a parallel form to obtain the received reference real time information (RCV TIME). Reference numeral 115 denotes a receiving clock generating unit which contains a clock extracting circuit (not shown) and a 1/m frequency division circuit. The receiving clock generating unit 115 extracts clock signals from the received STM-N signals, and dividing the frequency of the clock signals by m (m is an integer) to generate a receiving clock signal for use in the network element. Reference numeral 116 denotes an internal oscillator (INT OSC) which generates a self-generated clock signal which is to be used when the network element is designated as a synchronization master apparatus. Reference numeral 117 denotes an external oscillator (EXT OSC) which generates an external clock signal of high precision, and can be connected to the network element for supplying the external clock signal which is to be used as an alternative of the self-generated clock signal when the network element is designated as a synchronization master apparatus. Reference numeral 118 denotes a clock selector (SEL1) which selects as a synchronization clock signal (EC) one of the self-generated clock signal (or the external clock signal) and the receiving clock signal. The synchronization clock signal (EC) is supplied to various portions of the network element so that the network element operates in synchronization with the synchronization clock signal. Reference numeral 119 denotes a frequency division circuit which generates an RTC driving clock signal (RTC MCLK) by dividing the frequency of the above synchronization clock signal. Reference numeral 120 denotes a real time clock (RTC) circuit which is driven by the RTC driving clock signal (RTC MCLK) to generate as self-generated real time information (SELF RTC TIME1) a real time in the network element. The real time clock (RTC) circuit is commercially available as an integrated circuit (IC) for real time clock.

Reference numeral 121 denotes a central processing unit (CPU) which receives the above received reference real time information (RCV TIME) from the real time information extracting unit 114, and the self-generated real time information (SELF RTC TIME1) from the central processing unit (CPU) 120. When the network element is designated as a synchronization slave apparatus as explained later, the central processing unit 121 controls the clock selector 118 so that the clock selector 118 selects the receiving clock signal from the receiving clock generating unit 115. In addition, the central processing unit 121 selects as the real time for use in the above alarm control, the above received reference real time information (RCV TIME) from the real time information extracting unit 114. In addition, the central processing unit 121 performs the bit error operation concerning the bit error included in the received reference real time information (RCV TIME) by using error check information (code) when the error check information (code) accompanies the received reference real time information. The above real time for use in the above alarm control, is stored in an alarm event time register (not shoal) which is provided in the central processing unit 121. Further, the central processing unit 121 resets the real time clock (RTC) circuit 120 so that the real time output from the real time clock (RTC) circuit 120 synchronized with the received reference real time information.

When the network element is designated as a synchronization master apparatus as explained later, the central processing unit 121 controls the clock selector 118 so that the clock selector 118 selects the self-generated clock signal from the internal oscillator 116 (or external clock signal from the external oscillator 17). In addition, the central processing unit 121 selects as reference real time information to be transmitted (RTC TIME2) and as the real time for use in the above alarm control, the above self-generated real time information (SELF RTC TIME1). The real time for use in the above alarm control, is stored in the above alarm event time register (not shown) in the central processing unit 121. Then, the central processing unit 121 supplies the self-generated real time information (SELF RTC TIME1) to the real time information selector 122. Instead of simply supplying the self-generated real time information (SELF RTC TIME1) to the real time information selector 122, the central processing unit 121 can generate self-generated real time information (SELF RTC TIME2) associated with error check information by generating error check information (code) for the self-generated real time information (SELF RTC TIME1) and affixing the error check information (code) to the self-generated real time information (SELF RTC TIME1), to output the same to the real time information selector 122.

Although not shown, the central processing unit 121 collects information on an alarm event which occurs in the network element and the recovery of the alarm event. When the central processing unit 121 receives the information on the alarm event, the central processing unit 121 generates an alarm message which may contain information indicating a type of the alarm event and the real time at which the alarm event occurred or the alarm event was recovered. The above-mentioned real time stored in the alarm event time register, is used for determining the real time at which the alarm event occurred or the alarm event was recovered. Then, the central processing unit 121 transmits the alarm messages through the communication control unit 130 to a centralized monitor apparatus in the synchronous transmission network. Although not shown, each network element in the synchronous transmission network is connected to the centralized monitor apparatus through a transmission line provided separately from the optical transmission lines 111 and 126. The communication control unit 130 is provided between the above separate transmission line and the network element for controlling the communication between the central processing unit 121 and the centralized monitor apparatus. The above real time transmitted in the alarm message is selected by the central processing unit 121 as explained below. The above alarm reporting is carried out in accordance with the CCITT recommendations, X.733 (draft), "Information Technology-open Systems Interconnection Systems Management: Alarm Reporting Function", and X.734 (draft), "Information Technologyopen Systems Interconnection Systems Management: Event Report Management Function".

The real time information selector 122 receives the self-generated real time information (SELF RTC TIME2) from the central processing unit 121 and the received reference real time information (RCV TIME) from the real time information extracting unit 114, and selects one of the two pieces of real time information under the control of the central processing unit 121 as the reference real time information (SEND TIME) to be transmitted. The central processing unit 121 controls the selection in the real time information selector 122 so that the real time information selector 122 fixedly selects the received reference real time information (RCV TIME) from the real time information extracting unit 114 when the network element is designated as the synchronization slave apparatus, and fixedly selects the self-generated real time information (SELF RTC TIME2) from the central processing unit 121 when the network element is designated as the synchronization master apparatus. However, when a bit error is found in the received reference real time information (RCV TIME) by the above error check operation in the network element designated as the synchronization slave apparatus, the central processing unit 121 switches the real time information selector 122 so that the real time information selector 122 selects the self-generated real time information (SELF RTC TIME1) as the reference real time information to be transmitted.

Reference numeral 123 denotes an overhead generating unit (OH2) which receives the above reference real time information (SEND TIME) to be transmitted and the other information to be inserted in the overhead area of the STM-N frame; converts the received information into a serial form to generate overhead signals (OH) to be inserted into the STM-N signals to be transmitted. Reference numeral 124 denotes a multiplexer unit which multiplexes main signals (traffic signals) to be transmitted, and overhead signals to be transmitted, to generate the STM-N signals. The overhead signals multiplexed in the multiplexer unit 124 include the above portions (OH) generated by the real time information insertion unit (OH2) 123. The STM-N signals are converted to optical signals in the optical transmitter (OS) 125, and the optical signals are transmitted through the optical transmission line 126 to the adjacent network element.

In addition, the network element receives through the communication control unit 130 a command from the centralized monitor apparatus indicating whether the network element is designated as a synchronization master apparatus or a synchronization slave apparatus. Thus, the central processing unit 121 recognizes whether the network element is designated as a synchronization master apparatus or a synchronization slave apparatus, and performs the above-mentioned operations concerning the selection of the real time information accordingly.

Thus, the real times used in all of the other network elements are synchronized with the real time generated in the real time clock (RTC) circuit 120 in the synchronization master apparatus. Since the precision required for the real time is above the order of "one second", the transmission delay of the real time information from the synchronization master apparatus to each network element can be ignored. When a bit error is found by the above error check operation in one of the network elements designated as the synchronization slave apparatus, the real times used in all of the other network elements located downstream of the network element which found the bit error, are synchronized with the real time generated in the real time clock (RTC) circuit 120 in the network element which found the bit error.

Figure 5:
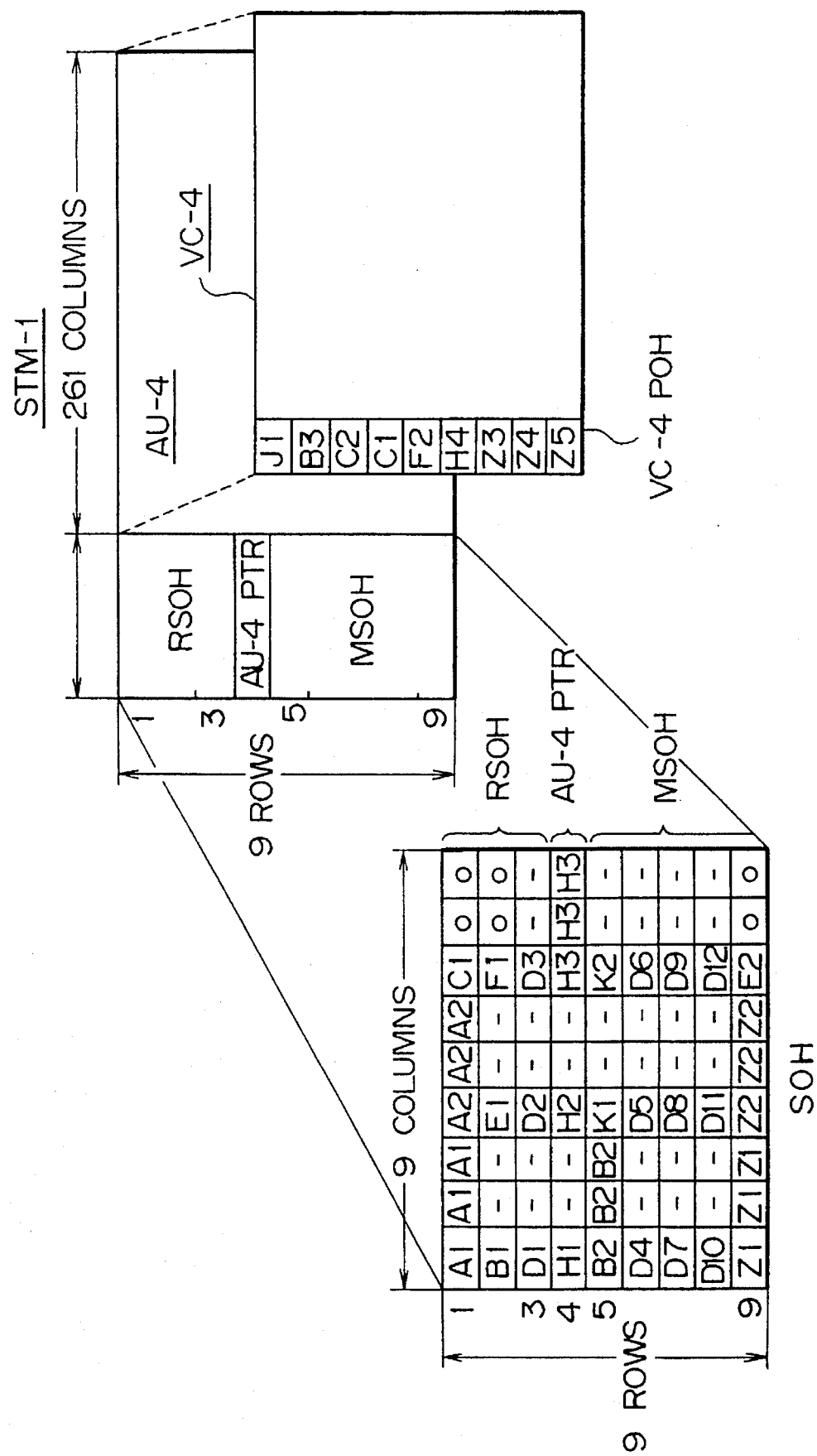
FIG. 5 is a diagram illustrating the format of the STM-1 frame as an example of the transmission frame format.

Example of Transmission Frame Format (FIG. 5)

FIG. 5 is a diagram illustrating the format of the STM-1 frame as an example of the transmission frame format. As well known, the STM-1 frame format is comprised of nine columns of section overhead (SOH), and 261 columns of pay load. Among the bytes in the section overhead (SOH), the bytes indicated by "o" are specified as "bytes reserved for national use", and the bytes indicated by "-" are not specified to be used for specific applications in the CCITT recommendations.

Therefore, any byte indicated by "-" can be used for transmitting the above reference real time information. Further, generally, any byte is not specified to be used for specific applications, can be used for transmitting the above reference real time information.

Figures 6A, 6B, 7:
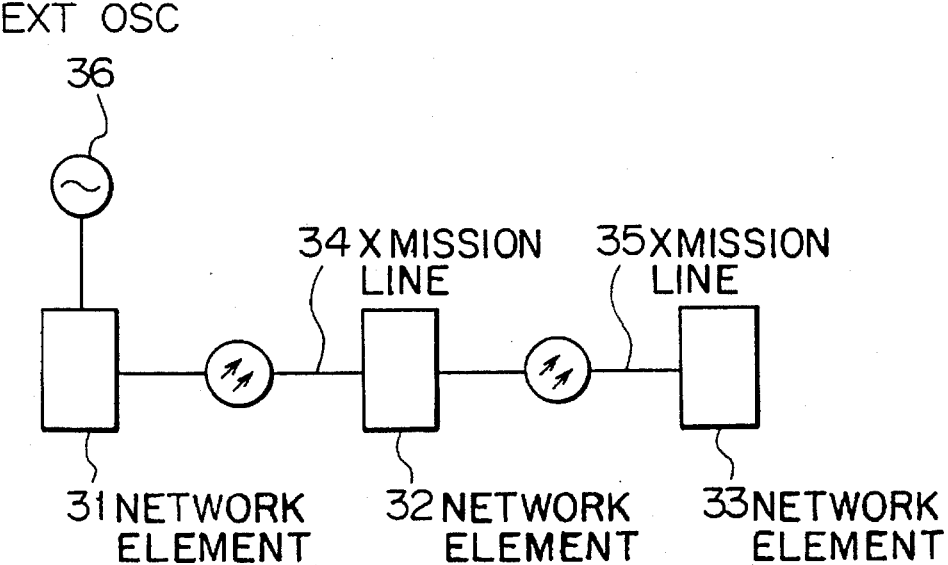
FIG. 6A is a diagram illustrating an example format of the reference real time information without an error check code.
FIG. 6B is a diagram illustrating the format of the reference real time information respectively with an error check code.
FIG. 7 is a diagram illustrating an example portion of the synchronous transmission network.

Example Format of Real Time Information (FIGS. 6A and 6B)

FIG. 6A is a diagram illustrating an example format of the reference real time information without an error check code. In FIG. 6A,, each block may be comprised of four bits or eight bits (one byte). For example, the block YY contains information on "year", MM contains "months", DD contains "day", HH contains "hour", mm contains "minute", and "SS" contains "second".

FIG. 6B is a diagram illustrating the format of the reference real time information respectively with an error check code. In FIG. 6B, the block indicated by "Check" contains the error check code.

Example Format of Real Time Information (FIG. 7)

FIG. 7 is a diagram illustrating an example portion of the synchronous transmission network. In FIG. 7, reference numerals 31, 32, and 33 each denote a network element, 34 and 35 each denote an optical transmission line, and 36 denotes an external oscillator connected to the network element 31. When the network element is designated as the synchronization master apparatus, and the network elements are respectively designated as the synchronization slave apparatuses, the network element 31 uses the external clock signal supplied from the external oscillator 36 as the above synchronization clock signal, generates and uses the self-generated real time information as the real time information, and transmits to the network element 32 adjacent to the network element 31, the self-generated real time information as the reference real time information. Since the network element 32 is designated as the synchronization slave apparatus, the network element 32 uses as the synchronization clock signal the receiving clock signal extracted from the transmission signals from the network element 31, and the reference real time information (RCV TIME) received from the network element 31; and transmits to the network element 33 adjacent to the network element 32, the received reference real time information (RCV TIME) as the reference real time information (SEND TIME). In the same manner as the network element 32, the network element 33 uses as the synchronization clock signal the receiving clock signal extracted from the transmission signals from the network element 32, and the received reference real time information (RCV TIME) received from the network element 32.

Figure 8:
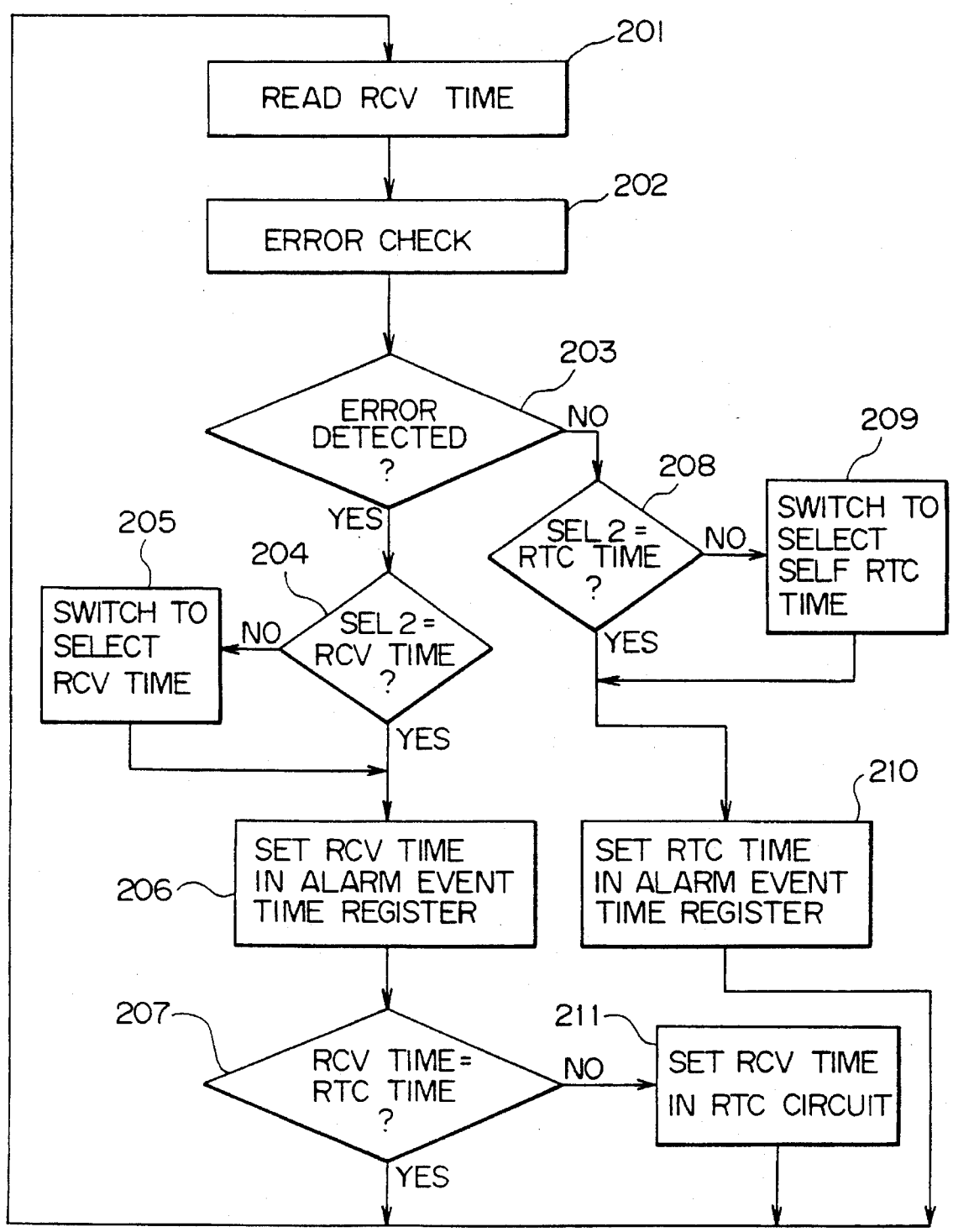
FIG. 8 is a diagram illustrating an example flow of the operations in the synchronization slave apparatus.

Example Flow in Slave Apparatus (FIG. 8)

FIG. 8 is a diagram illustrating an example flow of the operations in the synchronization slave apparatus. In step 201, the central processing unit 121 reads the received reference real time information (RCV TIME), and then, in step 202, performs calculation for the bit error check by using the error check code accompanying the received real time information. When it is determined in step 203 that the received reference real time information (RCV TIME) does not contain a bit error, the operation goes to step 204, in which it is determined whether or not the real time information selector (SEL2) 122 has been switched to select the received reference real time information (RCV TIME). When "yes" is determined in step 204, the operation goes to step 206. When "no" is determined in step 204, the operation goes to step 205, in which the real time information selector (SEL2) 122 is switched to select the received reference real time information (RCV TIME), and then the operation goes to step 206. In step 206, the received reference real time information (RCV TIME) is stored in the above-mentioned alarm event time register. Then, in step 207, it is determined whether or not the real time output from the real time clock (RTC) circuit 120 is equal to the received reference real time information (RCV TIME). When "yes" is determined in step 207, the operation goes back to step 201. When "no" is determined in step 207, the operation goes to step 211, in which the real time clock (RTC) circuit 120 is reset so that the real time output from the real time clock (RTC) circuit 120 is equal to the received reference real time information (RCV TIME). Then, the operation goes back to step 201.

When it is determined in step 203 that the received reference real time information (RCV TIME) contains a bit error, the operation goes to step 208, in which it is determined whether or not the real time information selector (SEL2) 122 has been switched to select the self-generated real time information (SELF RTC TIME2) from the central processing unit 121. When "yes" is determined in step 208, the operation goes to step 210. When "no" is determined in step 208, the operation goes to step 209, in which the real time information selector (SEL2) 122 is switched to select the self-generated real time information (SELF RTC TIME2). Then, the operation goes to step 210. In step 210, the self-generated real time information (SELF RTC TIME2) is stored in the above-mentioned alarm event time register. Then, the operation goes back to step 201.

I claim:

1. A real time clock synchronizing system, provided in each of a plurality of synchronous transmission network apparatuses in a synchronous transmission network, each said synchronous transmission network apparatus receiving synchronous signals from another of the plurality of synchronous transmission network apparatuses and transmitting synchronous signals to yet another one of the plurality of synchronous transmission network apparatuses, the synchronous signals conveying a transmission frame, and the transmission frame includes an area containing reference real time information indicating a real time in the synchronous transmission network;

the real time clock synchronizing system comprising:
a real time information generating means for generating, based on a reference clock, self-generated real information indicating a self-generated real time in the synchronous transmission network apparatus;
a real time information extracting means for extracting the reference real time information contained in the area containing reference real time information in the synchronous signals received by each said synchronous transmission network apparatus;
a first selector means for selecting as the reference real time information to be transmitted from the synchronous transmission network apparatus, one of the self-generated real time information and the reference real time information extracted by the real time information extracting means; and
a real time information inserting means for inserting the reference real time information selected by the first selector means, in the area containing reference real time information in the synchronous signals to be transmitted from each said synchronous transmission network apparatus.

2. A real time clock synchronizing system according to claim 1, wherein said area containing reference real time information is provided in an overhead of the synchronous signals.

3. A real time clock synchronizing system according to claim 1, further comprising a selector control means for controlling the first selector means, when each said synchronous transmission network apparatus is designated as a synchronization master apparatus in the synchronous transmission network, the first selector means selects the self-generated real time information.

4. A real time clock synchronizing system according to claim 1, further comprising a selector control means for controlling the first and second selector means, when each said synchronous transmission network apparatus is designated as a synchronization slave apparatus in the synchronous transmission network, the first selector means selects the reference real time information.

5. A real time clock synchronizing system according to claim 1, wherein the area containing real time information further contains error check information to be used by the real time information extracting means for performing a bit error check operation concerning a bit error included in the reference real time information;

said real time clock synchronizing system further comprising, an error check information generating means for generating error check information to be used by the error check means in the synchronous transmission network apparatus which receives the synchronous signals conveying the transmission frame including the area containing reference real time information, for performing a bit error check operation concerning a bit error included in the reference real time information, an error check information inserting means for inserting in the area containing real time information, the error check information, in addition to the reference real time information, an error check information extracting means for extracting the error check information from the area containing real time information in the synchronous signals received by each said synchronous transmission network apparatus, an error check means for performing an error check of the reference real time information contained in the area containing real tune information in the synchronous signals received by each said synchronous transmission network apparatus, by using the error check information extracted by the error check information extracting means, and a selector control means for controlling the first selector means, when each said synchronous transmission network apparatus is designated as a synchronization slave apparatus in the synchronous transmission network, the first selector means selects the reference real time information when an error is not found by the error check, and the first selector means selects the self-generated real time information when an error is found by the error check.

6. A real time clock synchronizing system according to claim 1, wherein each said synchronous transmission network apparatus containing a clock signal generating circuit for generating an a self-generated clock signal, and a receiving clock extracting circuit for extracting a receiving clock signal from the synchronous signals received by the synchronous transmission network apparatus; and the real time clock synchronizing system further comprising a second selector means for selecting as the synchronization clock signal one of the self-generated clock signal and the receiving clock signal.

7. A real time clock synchronizing system according to claim 6, further comprising a selector control means for controlling the first and second selector means so that, when each said synchronous transmission network apparatus is designated as a synchronization master apparatus in the synchronous transmission network, the second selector means selects the self-generated clock signal, and the first selector means selects the self-generated real time information.

8. A real time clock synchronizing system according to claim 6, further comprising a selector control means for controlling the first and second selector means so that, when each said synchronous transmission network apparatus is designated as a synchronization slave apparatus in the synchronous transmission network, the second selector means selects the receiving clock signal, and the first selector means selects the reference real time information.

9. A real time clock synchronizing system according to claim 1, wherein each said synchronous transmission network apparatus further comprises an alarm information generating means for generating alarm information containing a real time at which an alarm event occurs, where the real time is determined based on the reference real time information selected by the first selector means.

10. A real time clock synchronizing system according to claim 9, wherein each said synchronous transmission network apparatus further comprises an alarm event reporting means four transmitting the alarm information generated by the alarm information generating means, to a centralized monitor apparatus provided for controlling alarm information in the synchronous transmission network.

11. A real time clock synchronizing system according to claim 1, wherein the area containing real time information further contains error check information to be used by the real time information extracting means for performing a bit error check operation concerning a bit error included in the reference real time information;

said real time clock synchronizing system further comprising, an error check information generating means for generating error check information to be used by the error check means in the synchronous transmission network apparatus which receives the synchronous signals conveying the transmission frame including the area containing reference real time information, for performing a bit error check operation concerning a bit error included in the reference real time information, and an error check information inserting means for inserting in the area containing real time information, the error check information, in addition to the reference real time information;

an error check information extracting means for extracting the error check information from the area containing real time information in the synchronous signals received by each said synchronous transmission network apparatus, an error check means for performing an error check of the reference real time information contained in the area containing real time information in the synchronous signals received by each said synchronous transmission network apparatus, by using the error check information extracted by the error check information extracting means, and a selector control means for controlling the first and second selector means, when each said synchronous transmission network apparatus is designated as a synchronization slave apparatus in the synchronous transmission network, the second selector means selects the receiving clock signal; and the first selector means selects the reference real time information when an error is not found by the error check, and the first selector means selects the self-generated real time information when an error is found by the error check.

* * * * *

UNITED STATES PATENT AND TRADEMARK OFFICE
CERTIFICATE OF CORRECTION

PATENT NO. : 5,535,251
DATED      : 07/9/96
INVENTOR(S): Eiji SUGAWARA

It is certified that error appears in the above-indentified patent and that said Letters Patent is hereby corrected as shown below:

In column 12, Claim 4, delete "and second" from the third line.

In column 14, Claim 11, Delete "Claim 1," and insert
--Claim 6,--.

Signed and Sealed this

Tenth Day of February, 1998

Attest:

BRUCE LEHMAN

*Attesting Officer*      *Commissioner of Patents and Trademarks*